United States Patent
Hamik et al.

(10) Patent No.: US 10,657,777 B2
(45) Date of Patent: May 19, 2020

(54) SEGMENT, LINEAR DRIVE AND METHOD FOR OPERATING A LINEAR DRIVE

(71) Applicants: Siemens Aktiengesellschaft, Munich (DE); Festo AG & Co. KG, Esslingen (DE)

(72) Inventors: Reinhold Hamik, Waiblingen (DE); Fabian Albert, Kernen im Remstal (DE); Ralf Hartramph, Albershausen (DE); Andreas Veit, Filderstadt (DE)

(73) Assignees: Siemens Aktiengesellschaft, Munich (DE); FESTO AG & CO., Kgesslingen (DE)

( * ) Notice: Subject to any disclaimer, the term of this patent is extended or adjusted under 35 U.S.C. 154(b) by 0 days.

(21) Appl. No.: 15/480,506

(22) Filed: Apr. 6, 2017

(65) Prior Publication Data

US 2017/0309139 A1    Oct. 26, 2017

(30) Foreign Application Priority Data

Apr. 22, 2016  (EP) .................................... 16166626

(51) Int. Cl.
*G08B 5/36* (2006.01)
*G05B 23/02* (2006.01)
*G08B 21/18* (2006.01)

(52) U.S. Cl.
CPC ........... *G08B 5/36* (2013.01); *G05B 23/0216* (2013.01); *G08B 21/18* (2013.01)

(58) Field of Classification Search
CPC ....... G08B 5/36; G08B 21/18; G05B 23/0216
(Continued)

(56) References Cited

U.S. PATENT DOCUMENTS 6,508,353 B1 * 1/2003 Edstrom ................ G01B 7/004
   198/502.3
7,591,365 B2 * 9/2009 Knepple ................ B65G 37/02
   198/460.1

(Continued)

FOREIGN PATENT DOCUMENTS

CN   101009455   8/2007
CN   101114806   1/2008

(Continued)

OTHER PUBLICATIONS

Siemens AG Carstens, Jürgen: "Linearantrieb eines Schubplattenverbandes"; in: IP.com Journal, IP.com Inc., West Henrietta, NY, US; XP013121359; ISSN: 1533-0001.

(Continued)

*Primary Examiner* — Jack K Wang
(74) *Attorney, Agent, or Firm* — Cozen O'Connor

(57) ABSTRACT

A sensor with a signal strip, a segment with such a signal strip and a sensor, a linear drive and an installation, wherein the signal strip is assigned in each case to at least one segment, where the signal strip indicates a state of the segment and/or the state of a runner, where the at least one runner is moved by a respective segment, the state is assigned by a sensor assigned to the respective segment and is presented to a user who services the installation, in particular the linear drive of the installation, such the time interval for servicing the installation or the linear drive can be reduced because the operator of the linear drive immediately identifies the state of the respective runner or the respective segment.

24 Claims, 5 Drawing Sheets

(58) Field of Classification Search
USPC .................................................... 340/686.5
See application file for complete search history.

(56) References Cited

U.S. PATENT DOCUMENTS

| | | | | |
|---|---|---|---|---|
| 8,757,363 | B2* | 6/2014 | Combs | B65G 43/10 198/781.01 |
| 2002/0084173 | A1 | 7/2002 | Paquette | |
| 2005/0049745 | A1* | 3/2005 | LeVasseur | B65G 43/10 700/230 |
| 2009/0266678 | A1* | 10/2009 | Horn | B65G 13/06 198/606 |
| 2012/0290126 | A1* | 11/2012 | Combs | B65G 43/10 700/230 |
| 2014/0073231 | A1* | 3/2014 | Fischer | A22C 15/002 452/51 |
| 2014/0212250 | A1* | 7/2014 | Wolter | G07F 11/165 414/281 |
| 2016/0335833 | A1* | 11/2016 | Huang | A47J 39/003 |
| 2017/0028610 | A1* | 2/2017 | Gerhards | B29C 49/4205 |

FOREIGN PATENT DOCUMENTS

| | | |
|---|---|---|
| EP | 1028866 A1 | 8/2000 |
| EP | 1777034 | 4/2007 |
| WO | WO 99/24284 | 5/1999 |

OTHER PUBLICATIONS

"Watchdog Elite—Bucket Elevator & Conveyer Hazard Monitor"; in 4b BRAIME—Product Information; XP055309077.

* cited by examiner

SEGMENT, LINEAR DRIVE AND METHOD FOR OPERATING A LINEAR DRIVE

BACKGROUND OF THE INVENTION

1. Field of the Invention

The invention relates to a segment and a signal strip, a linear drive comprising such a segment, an installation with the linear drive and to a method for operating the linear drive.

2. Description of the Related Art

Currently, linear drives serve in many fields for positioning goods and workpieces. Modern linear drives comprise segments, with the segments being configured to move runners, where the runners are situated on the segments and are positioned by the segments.

A disadvantage of linear drives, in particular when used in an installation, such as a production machine, lies in the difficulty of servicing the linear drive.

SUMMARY OF THE INVENTION

In view of the foregoing, it is therefore an object of the invention to simplify the servicing of a linear drive and the components thereof.

This and other objects and advantages are achieved in accordance with the invention by a segment, a linear drive, a method for operating such a linear drive, and a signal strip, where the signal strip comprises a plurality of signaling devices, in particular optical signaling devices, arranged next to one another, and a sensor for determining the position and/or a speed of at least one runner which is movable along the signal strip.

In accordance with the invention, the signal strip is configured to signal a position and/or movement of the respective runner by means of the signaling devices, where the signal strip is further configured to indicate a state of a segment, and the runner is configured to move along the segment.

In an advantageous embodiment of the signal strip, the signal strip or the sensor comprises a computing unit, the computing unit is configured to actuate the signal strip based on a signal of the sensor or the state of the segment.

By way of the signal strip described here, it is possible, in particular, to retrofit a pre-existing linear drive with such a signal strip and advantageously expand the functionality thereof.

It is also an object of the invention to provide an installation, in particular a production machine, machine tool, packaging machine, assembly line, handling line or a filling installation, comprising such a linear drive.

In accordance with the invention, the linear drive comprises segments arranged next to one another, where the segments comprise stators of linear motors. The runners are moved along the segments, analogously to a linear motor. A control unit serves in each case to supply the segment with voltage or current. The control unit may be configured as a power converter or an amplifier. Advantageously, the control unit comprises closed-loop control for current or voltage and closed-loop control for the position and/or speed of the runners. The control device serves to predetermine a movement sequence for the respective runners. The control device is advantageously configured as a programmable logic control or as a movement controller. The control units are advantageously configured as (intelligent) frequency converters or power converters, which provide the movement sequence in terms of a voltage or current for coils of the segments. At least some of the segments have a sensor. The sensor serves to determine the position of the at least one runner situated on the segment. The sensor advantageously provides the position and/or the speed of the respective runner for the control device and/or the corresponding control unit, in particular for the closed-loop control of same.

The segment for the linear drive serves to induce movement of the at least one runner. The segment optionally comprises a sensor, with the sensor being configured to determine the position and/or the speed of the runner.

In addition, a signal strip, in particular the above-described signal strip, is assigned to the segment, where the signal strip is configured to indicate a state of the runner and/or to indicate the state of the segment. The signal strip need not be fastened to the corresponding segment. The signal strip may also be arranged at a distance from the segment.

The signal strip may comprise a plurality of signaling devices, in particular optical signaling devices, arranged next to one another. The signaling devices serve to indicate the state of the segment and/or of the runner. Advantageously, the state of the segment is indicated at the position of the signal strip that corresponds to the position of the runner and/or the segment.

By way of example, it is possible in each case for that signaling device of the signal strip, which is situated at the position or near the position of the runner or of the segment, to light up.

The signal strip may be assigned to an individual segment. In terms of its dimensions, the signal strip may also go beyond an individual segment or run over a plurality of segments.

The segment may be connected to the signal strip in both a secure and also detachable manner.

By way of example, a state of the segment is understood to mean the degree of dirtying of a surface, the presence of a malfunction, a servicing cycle being reached, the temperature of the segment, i.e., the temperature of the coils of the segment, or the functionality.

By way of example, the state of a runner is understood to mean the degree of dirtying, the servicing cycle or a malfunction of the runner. Preferably, the state of the runner is the position and/or the speed of the runner.

The disclosed embodiments of the invention facilitate a particularly vivid indication of the state of the segment or of the state of a runner. The state is particularly advantageously indicated precisely where a state should be indicated or where a state is present. Hence, servicing of a segment, a runner or a linear drive is indicated where the state possibly requires servicing or replacement of the segment, or entails these. Hence, the user can immediately identify which runner or which segment should be replaced or serviced.

In a simple case, the signal strip may indicate the position of the runner by virtue of the signaling device arranged in a manner corresponding to the position of the runner lighting up.

By way of example, by lighting up at least some of the signaling devices that are assigned to the corresponding segment, the signal strip is able to indicate the state of the segment. The part of the signaling devices that are assigned to the segment preferably serves to indicate the state, in particular a malfunction, of the segment.

Based on a code set in advance, a specific state may be indicated by a set pattern. For example, flashing of the corresponding signaling devices may indicate a malfunction. Further, a colored light signal, in particular a green light signal, may indicate a passed self-test during configuration. The signal strip may also indicate a state by a graphical display, such as a display or light signals. Thus, first signaling devices may indicate the position of the runner on the segment that is assigned to the signal strip. Second signaling devices, in particular a graphical display, may indicate the state of the segment.

In an advantageous embodiment of the segment or of the signal strip, the signal strip is configured as an LED strip.

LED strips are known with different illuminances, lighting colors or connection options. The LED strip may be fastened for the segment in a simple manner on the segment. Moreover, LED strips are energy-efficient, low maintenance and have a particularly long service life.

In a further advantageous embodiment of the segment or of the signal strip, the signal strip is assigned to the sensor.

The sensor advantageously serves to determine the position and/or capture the speed of the runner. Further, the sensor may also be embodied to determine the state of the segment.

The sensor may be configured in accordance with the following operating principles: magnetostrictive, capacitive, magnetic, optical, inductive, or differential-transformer-like.

Preferably, the sensor for determining the position of the runner is equipped with a Hall sensor or a plurality of Hall sensors.

The signal strip may be fastened to the segment via a detachable connection, with the segment already comprising one sensor. Preferably, a segment, a sensor and a signal strip form a structural unit. Further, the sensor may be connected directly to the signal strip via a technical data connection. Hence, the signal strip can indicate the position of the runner, even though there is no connection of the associated segment to a control device or to a control unit, or even though no such connection is required.

Also, a plurality of individual sensors may be combined to capture the states described above, with at least some of the sensors being assigned to respectively one segment.

A plurality of such sensors or sensor elements may be arranged next to one another in the case of a linear drive with a long extent.

The linear drive comprises at least one segment, where the linear drive comprises a control device, and where the control device is provided for predetermining the movement of the runners on the at least one segment.

The linear drive may correspond to what was explained above or may be formed by a conventional linear motor, to which at least one signal strip is assigned. Further, a linear drive described here may be formed as a spindle drive, as a conveyor belt, as a chain drive or as a toothed belt drive, and as a combination of at least two of the aforementioned embodiments.

In an advantageous embodiment of the linear drive, the sensor provides the position and/or the speed of the at least one runner for the control device and the control device provides a signal for the signal strip based on the position and/or speed of the at least one runner, wherein the signal strip specifies the state at the position of the corresponding runner based on the signal from the control device.

The control device and/or the control unit is advantageously connected to the segment assigned to the sensor via a bidirectional signal connection. The bidirectional signal connection may transfer signals in a bidirectional manner.

The sensor provides the state of the respective segment and/or of the respective runner for the control device and/or the control unit or the control device by virtue of the state being transferred, encoded in a signal, to the control device and/or to the control unit.

The control device, the control unit and/or the sensor transfer the states to the signal strip via a bidirectional signal connection. The signal strip represents the signal, preferably in a visual manner. As a result of the visual display, the user can easily identify the state of the runner, of a control unit and/or of the segment by way of the signal strip.

The bidirectional signal connection between the respective sensor, the control device and/or the respective control unit serves for a particularly simple connection between the aforementioned units. A bidirectional signal connection may be formed by a network connection. Advantageously, the network connection is real-time capable. By way of example, the real-time capable Ethernet connection, such as DRIVE-CLiQ or Profinet serves to connect the sensors, the control device and/or the respective control unit.

The sensors, control units and the control device may be connected in a particularly simple manner by way of the bidirectional connection. By selecting a signal connection with a bidirectional configuration in particular, it is possible for the linear drive to be expanded easily and without significant reconfigurations.

In a further advantageous embodiment of the linear drive, the control device provides the signal for the signal strip.

Based on a prescription, the control device may actuate the signal strip from the outside, such as from an intranet or the Internet. The control device may further obtain the signal that contains the state of the respective segment and/or the state of the runner from a sensor.

The state to be indicated may be ascertained with the aid of the sensor and/or may be calculated with the aid of the control device. Thus, the progress of a servicing interval may be ascertained by the control device or may be predetermined from the outside. The progress of the servicing interval may be indicated by a corresponding signal code by way of the signal strip. As a result of this embodiment, the signal strip may also be configured as a human-machine interface (HMI) of the control device, of the respective runner, of the respective segment and/or of the respective control unit.

In a further advantageous embodiment of the linear drive, the signal for the signal strip is provided by a network, in particular an intranet, the Internet or by a cloud.

The control device may provide data for at least one computing unit by way of the network, in particular by way of a (service) cloud. Data is understood to mean, e.g., motor currents, positions of the runners, usage times of runners or segments. The data relate, in particular, to states of the runner and/or of the segment. The data are advantageously analyzed and/or stored by a computing unit. Here, the computing unit is to the control device, the control unit, the respective segment and/or the probably occurring states may be calculated by the computing unit and may be transferred by the network and the control device to the signal strip. The signal strip then serves to display a probably occurring state.

In a further advantageous embodiment of the linear drive, the state of the segment and/or of the runner specifies the degree of dirtying or a functional state of the runner and/or of the segment.

The degree of dirtying may either be calculated via a calculation based on the predetermined sequence of work steps or ascertained with the aid of a sensor or visual monitoring, in particular via a camera. Here, the calculation is advantageously performed in the control device or in the computing unit. Should there be dirtying of the runner, this may be indicated in an exemplary manner by a color signal at the position of the runner.

Advantageously, the visual display may also identify dirtying which the operating staff cannot identify visually. Further, disadvantageous residues on the respective segment or the respective runner may be indicated; these may likewise not be identified visually by the operating staff—but may be identified by a sensor or visual monitoring. This may advantageously increase operational continuity.

In a further advantageous embodiment of the linear drive, the at least one signal strip of the linear drive indicates the state of the runner at the position of the runner.

As a result of this configuration, it is possible to remove malfunctioning runners more easily during the operation of the linear drive because the state of the respective runner is even indicated during the movement thereof.

Should a runner need to be replaced or serviced, the corresponding signaling devices may indicate this by way of a signal corresponding to the state. By way of example, the position of the runner may be indicated by a green-colored lighting signal of the signaling device. In the case of a defective, dirtied or service-requiring runner, the corresponding signaling device may output a red light signal and hence indicate the necessity of cleaning or replacing the runner.

In the case of a further advantageous embodiment of the linear drive, the linear drive further comprises a signal connection between the respective segment and the control device, where the signal connection is provided both for transferring the position and/or the speed from the sensor to the control device and for transferring state signals, in particular of the respective runner, from the control device to the respective signal strip.

As a result of the bidirectional signal connection, it is possible to transfer the state of the segment and/or the state of the runner, ascertained using the sensor, to the respective control unit and/or control device.

As a result of the bidirectional signal connection, it is possible to transfer signals with respect to the state of the segment from the control device and/or from the respective control unit to the signal strip.

A bidirectional signal connection contributes to reducing the cabling outlay, particularly if the sensor and the signal strip form a unit.

By way of example, the network connection outlined above may serve as a bidirectional signal connection.

In a further advantageous embodiment of the linear drive, the signal strip is configured to display an unpredicted state of the corresponding segment or of a control unit, where the control unit is assigned to the corresponding segment. An unpredicted state is understood to mean, in particular, a defect of a runner or of a segment.

By way of example, the unpredicted state of the segment or of the runner may be ascertained by a further sensor, for example in the corresponding control unit. By way of example, if a coil of the segment has a break, this break may be determined with the aid of a sensor assigned to the control unit.

Advantageously, the sensor comprises a computing unit, in particular a microcontroller, with the microcontroller registering the state captured by the sensor. Advantageously, the computing unit also serves to process the captured states. With the aid of the computing unit, the state is converted into a transferable signal and provided to the control device, the control unit and/or the signal strip.

In a further advantageous embodiment of the linear drive, the at least one runner respectively comprises an identification and/or a storage element, where the storage element is configured to record a state of the respective runner, and the state of the respective runner is indicatable by the signal strip.

Such an identification may be understood to mean a barcode or a QR code or any other readable identification suitable for identifying the runner. The identification is preferably assigned to the runner.

By way of example, an RFID chip serves as a storage element. The storage element serves to receive states or further data relating to the respective runner or the respective segment. Thus, an error code such as a dirtying state or servicing state, which was stored with respect to the respective runner in the storage element by the control device, may be read out within the scope of servicing work.

Data stored in the storage element or present in the identification may be read with the aid of a readout unit. The data may be transmitted to the control device, the control unit and/or to the network. By way of example, a state ascertained by the sensor may be linked to a corresponding state, in particular a calculated state, or the state may be corrected. The corrected state is then transferred to the signal strip.

A linear drive described here may find use in a multiplicity of industrial installations. By way of example, the use of the linear drive occurs in a machine tool, in a packaging machine, in a production machine, in a filling installation. Particularly advantageously, such a linear drive is suitable for positioning goods and workpieces with the aid of the runners (in an installation) and/or transporting goods and workpieces from one installation to another installation.

In an advantageous embodiment of the installation, at least one segment is assigned to the installation, where a sensor is assigned to the at least one segment, the installation further comprises a signal strip, where the signal strip is visible from outside the installation, and where the signal strip is configured to indicate at least one state of the segment and/or of the runner.

Advantageously, the signal strip is fastened to an outer side of the installation.

The signal strip visible from the outside may also complement a signal strip directly assigned to the linear drive. The signal strip visible from the outside advantageously indicates the same thing.

As a result of the present embodiment of the installation, a user may immediately identify the state of a segment and/or of a runner in the interior of the installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Below, the invention is described and explained in more detail on the basis of figures. Here, the figures show features which may also be combined to form new feature combinations or individual features in isolation, which may be assembled to form new embodiments, in which.

DETAILED DESCRIPTION OF THE EXEMPLARY EMBODIMENTS

Figure 1:
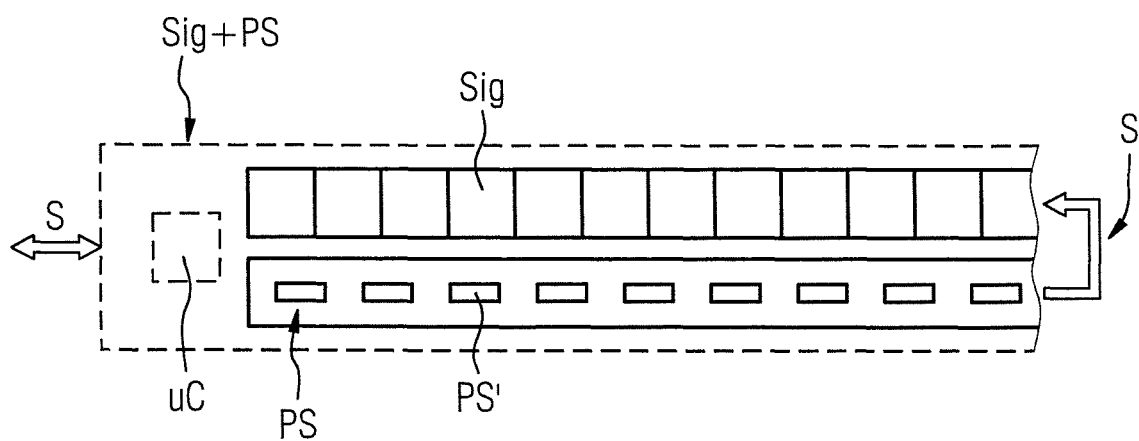
FIG. 1 shows a signal strip with a sensor in accordance with the invention.

FIG. 1 shows a signal strip Sig with a sensor PS. The signal strip Sig comprises a plurality of signaling devices. The signaling devices comprise lighting elements, in particular LEDs, in this case. However, the signaling devices may each also be configured as acoustic signaling devices, as a graphical display element or as a liquid crystal display. A sensor PS is assigned to the signal strip Sig. The dashed edging of the sensor indicates that the sensor PS and the signal strip Sig form a unit. The sensor PS has individual sensor elements PS'. Optionally, a computing unit uC, in particular a microcontroller, is assigned to the signal strip. Advantageously, the computing unit uC is also part of the unit. The computing unit uC may also be assigned to the sensor PS itself. The arrow from the sensor PS, which comprises a plurality of individual sensor elements PS' in this case, symbolizes a transfer of signals S from the sensor PS or the respective sensor element PS' to the signal strip Sig. Respectively, one sensor element PS may also be connected to respectively one signaling device. The signal strip Sig also comprises an interface, with the interface serving to output and input signals S. The interface may be configured as a network connector.

Figure 2:
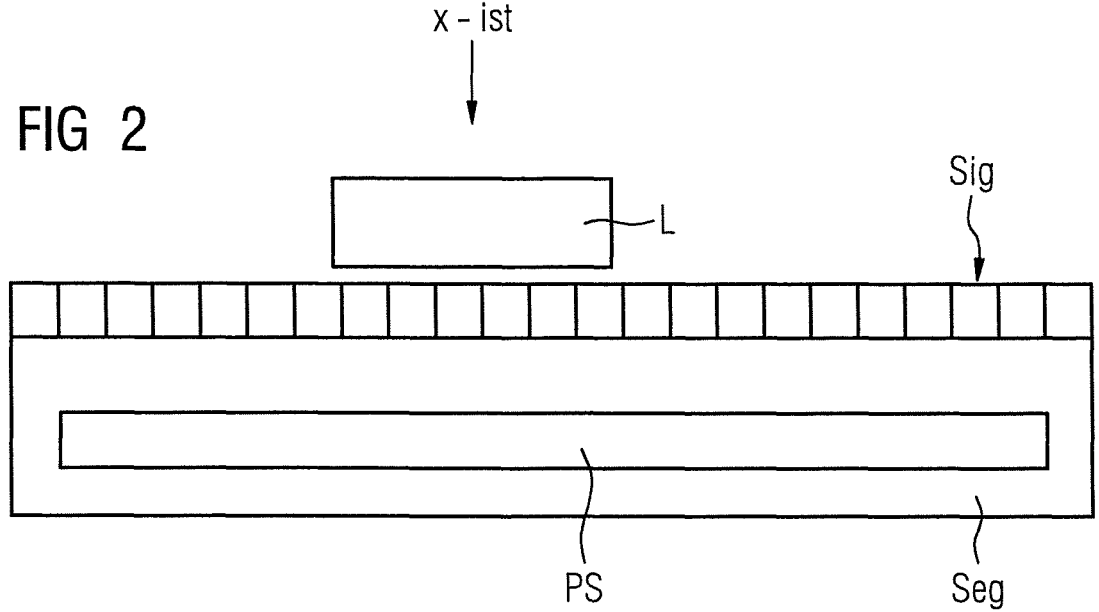
FIG. 2 shows a segment and a runner in accordance with the invention.

FIG. 2 shows a segment Seg and a runner L. The runner L may also be positioned on the segment Seg on rollers and/or with the aid of a rail (not shown here). The runner L has a position x-ist on the segment Seg. The position x-ist is determined with the aid of the sensor PS. Further, a signal strip Sig is assigned to the segment Seg. The signal strip Sig serves to indicate the position x-ist of the runner L. The signal strip Sig is fastened to the segment Seg such that the signaling devices of the signal strip Sig may indicate the position x-ist of the runner L in a visually identifiable manner. Advantageously, the signal strip Sig is arranged on a side of the segment Seg to this end.

By way of example, the sensor PS for determining the position x-ist of the runner L is based on the principle of magnetostriction. A sensor PS comprising a multiplicity of Hall sensors as sensor elements PS' is also possible. The runner L requires a magnetic element in such a case. However, an optical sensor PS, where the magnetic element should be replaced by lighting means, is also possible. The signaling devices are advantageously formed as LEDs.

The segment optionally comprises a supply connector for supplying voltage or current. The voltage or current is provided for moving the at least one runner L on the segment Seg. The supply connection serves for connection at a control unit U (not shown here).

Figure 3:
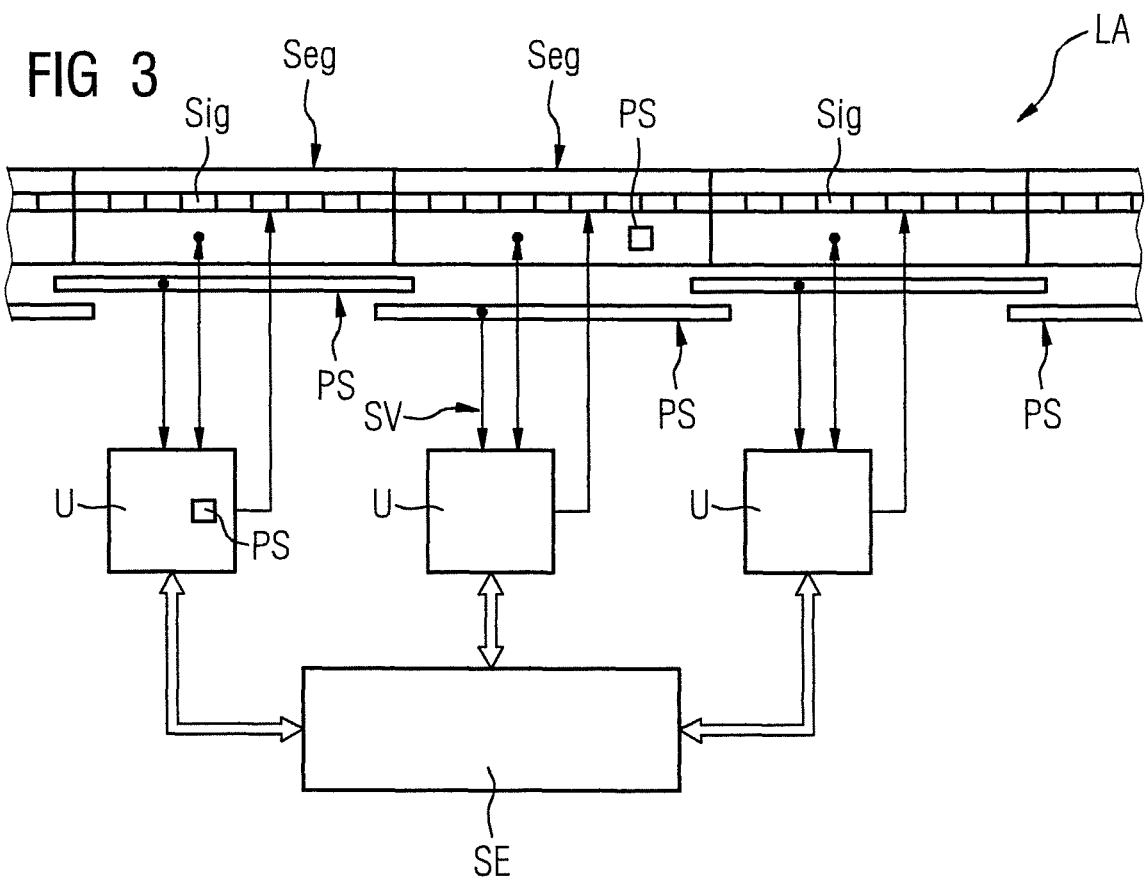
FIG. 3 shows a linear drive in accordance with the invention.

FIG. 3 shows a linear drive LA. The linear drive LA has segments Seg arranged sequentially next to one another. The segments Seg serve to move and/or guide runners L. In regions, the segments Seg may also be configured as a conveyor belt.

A sensor PS is assigned in each case to the respective segment Seg. Even though respectively one sensor PS is assigned to the segments Seg in FIG. 3, the sensors PS are not required for the functioning of the linear drive LA. The sensor PS that is assigned in each case to the segment Seg advantageously serves to ascertain the position x-ist of the respective runner L on the segment Seg. Further sensors PS which, e.g., are assigned to respectively one segment Seg, serve to ascertain a further state of the runner L and/or of the segment Seg. The temperature of the segment Seg may be a further state of the segment Seg.

The segments Seg are respectively connected to a control unit U. The control units U serve to supply voltage or current to the segment Seg. The control unit U itself advantageously optionally comprises a sensor PS. The control units U are respectively connected to a sensor PS by way of a signal connection SV for interchanging signals S. Shown in each case is a segment Seg with an assigned control unit U. The respective control units U are connected to a control device SE by way of a signal connection SV.

The control unit U serves to control the respective segment Seg. The control device SE serves to control the movement of runners L. The control device SE thus, as it were, controls the control units U. The control unit U is formed in an exemplary manner by a power converter, optionally with closed-loop control. The control device SE is advantageously configured as a movement controller, in particular as a programmable logic control.

The sensor PS advantageously ascertains the position x-ist of the runner L and transmits the position x-ist of the runner L to the control unit U. The control unit U transmits the position x-ist of the runner L to the corresponding signal strip Sig. In particular, the signal strip Sig serves to indicate the position x-ist of the runner L. The signal connections SV are drawn in unidirectional fashion. Depending on the embodiment of the signal connection SV, the respective signal connection SV may also have a bidirectional embodiment. Whether a signal connection SV has a bidirectional or at least unidirectional configuration is shown by the directions of the arrows.

Optionally, the control unit U and/or the segment Seg may likewise comprise a sensor PS. The sensor PS of the segment may be configured as a temperature sensor. The sensor PS of the control unit U may also be configured as a current sensor. The respective current sensor serves to determine the current that is provided for the segment Seg by the control unit U. In particular, the respective temperature sensor serves to determine the temperature of the coils of the segment Seg.

When a normal range of the ascertained state of the segment Seg is departed from, e.g., in the case of a high temperature, this may be indicated by the signal strip Sig. Likewise, the signal strip Sig may indicate the state of the corresponding control unit U.

Figure 4:
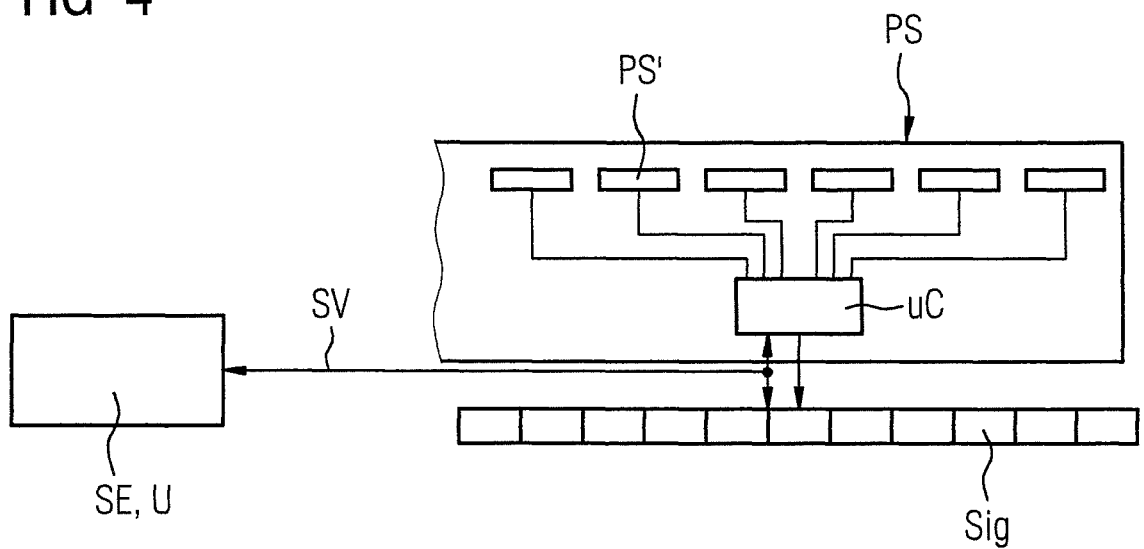
FIG. 4 shows a possible course of signal connections in accordance with the invention.

FIG. 4 shows a possible course of the signal connections SV. A sensor PS is shown. The sensor comprises a plurality of sensor elements PS', where the sensor PS may be configured to determine the position x-ist of a runner L on a linear drive LA. The sensor PS moreover comprises a computing unit uC. The computing unit uC is advantageously configured as a microcontroller. The computing unit uC is connected to a signal strip Sig by way of a signal connection SV. The signal connection SV may have either a unidirectional or a bidirectional configuration.

The control unit U and/or the control device SE is connected to the sensor PS and the signal strip Sig with the aid of the signal connection SV, which has a bidirectional configuration.

The sensor PS may have different types of sensor elements PS', such as Hall sensor elements for determining the position x-ist of a runner. Further, a sensor element PS' may be configured as a temperature sensor element. The temperature sensor element is able to determine the temperature of the segment Seg if the sensor PS is fastened to the segment Seg.

The signal strip Sig is assigned to the sensor PS here. The signal strip Sig and the sensor PS may form a structural unit. The unit advantageously comprises an interface for the signal connection SV, wherein the signal connection SV has a bidirectional embodiment.

Figure 5:
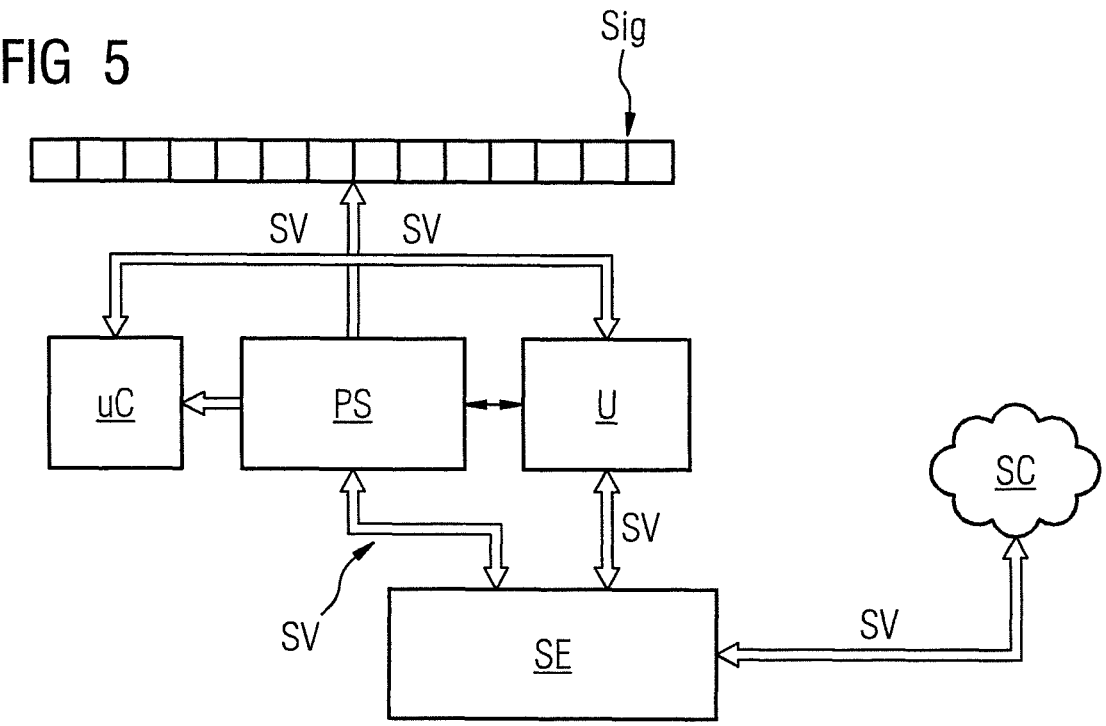
FIG. 5 shows a further possible signal course in accordance with the invention.

FIG. 5 shows a further possible signal course. Here, the control device SE is connected to a computer network SC, in particular a service cloud, by way of a signal connection SV. The computer network SC may provide the states of the individual elements of the linear drive LA to the control device SE. Elements of the linear drive, in particular of the individual segments Seg and/or of the respective runners L, are to be made available here to the control device SE. The control device SE provides the states of the respective control unit U. The provision of the states is performed by a signal connection SV. The signal connections SV respectively have a bidirectional embodiment here.

The control device SE and the control unit U are each connected to the sensor PS. The sensor PS ascertains the states of the respective segment Seg. The sensor PS also provides the ascertained states to the computing unit uC, with the computing unit uC being assigned to the respective sensor PS. Further, the computing unit uC is connected to the control unit U via of a bidirectional signal connection SV. The computing unit uC and, optionally, the sensor PS are connected to the signal strip Sig via a unidirectional signal connection SV. The signal strip Sig is optionally also connected to the control unit U.

The sensor PS ascertains at least one state of at least one runner L, at least and/or of one segment Seg. The state is provided to the control unit U, the control device SE and/or the signal strip Sig. The signal strip Sig serves to display the state of the segment Seg and/or of the runner L. In an exemplary manner, the signal strip Sig lights up at the position x-ist of a runner L on the segment Seg.

Advantageously, the control device SE may compare the ascertained state from the sensor PS with a state provided by the computer network.

Figure 6:
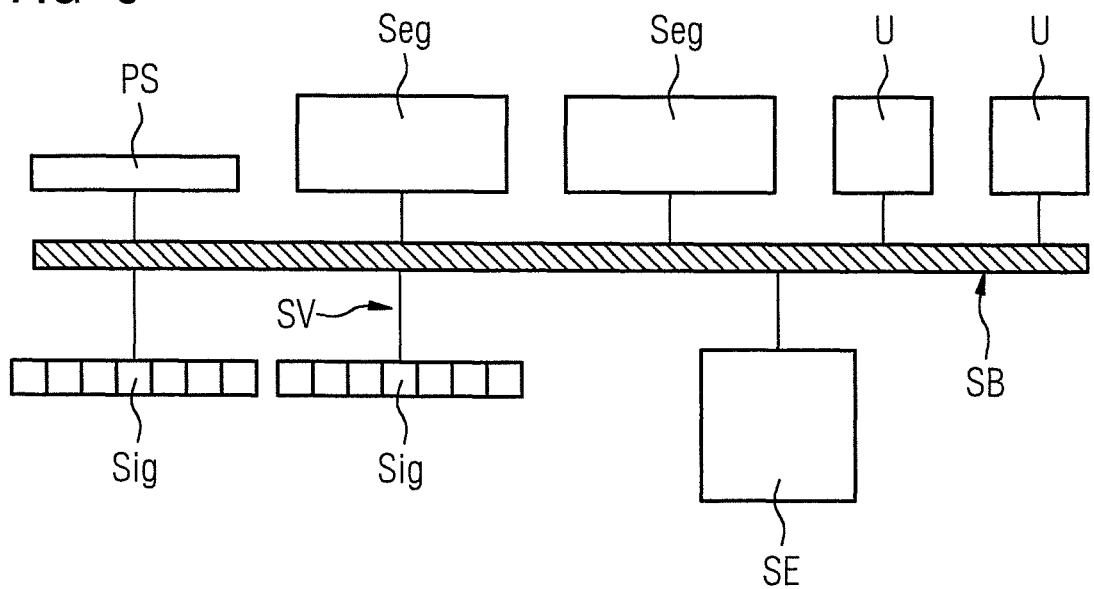
FIG. 6 shows an embodiment of a signal connection in accordance with the invention.

FIG. 6 shows an embodiment of the signal connections SV. Here, the signal connections SV are depicted as a signal bus SB. The signal connection SV as a signal bus SB serves in this case to connect the control unit U, the control device SE, the respective segment Seg, the respective signal strip Sig and the respective sensor PS. The signal connections in each case have a bidirectional configuration. Advantageously, a network connection such as an Ethernet, a ProfiBUS, EtherCAT or Drive-CliQ serves as signal connections SV or the signal bus SB. Advantageously, such a signal bus SB may be used to transfer different states, signals or information items. If a signal bus SB is suitably selected, the outlay on cabling may be greatly reduced because use is only still made of a universal interface, to which elements of the linear drive LA listed above may be connected and at which they interchange information items such as signals or states.

Figure 7:
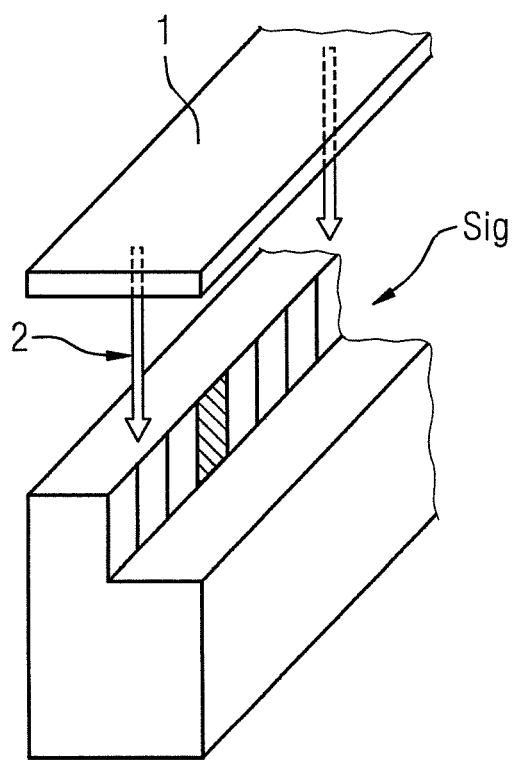
FIG. 7 shows a signal strip in accordance with the invention.

FIG. 7 shows a signal strip Sig. The signal strip Sig comprises a plurality of signaling devices. The signaling devices are each formed as optical signaling devices, in particular as LEDs. The signaling devices advantageously shine in different colors upon actuation. This allows respectively different states to be indicated in respectively different colors. Furthermore, respectively different states can be in different lighting patterns (e.g., periodic flashing, or continuous shining).

The signaling devices are arranged such that the state, indicated by the respective signaling device of the signal strip Sig, is easily visible from one side. The signal strip is covered by a lid 1. The signal lid 1 covers the signal strip Sig from above. The signaling devices have a withdrawn embodiment such that the signaling devices are protected from external contaminants by the cover 1 from above and the housing of the signal strip sig. As depicted by the arrows 2, the lid is fastened to the signal strip Sig from above. The signal strip and the cover may also have an integral embodiment.

The hatching of the one signaling device indicates how a luminous signal is visible when observed from the appropriate side.

Figure 8:
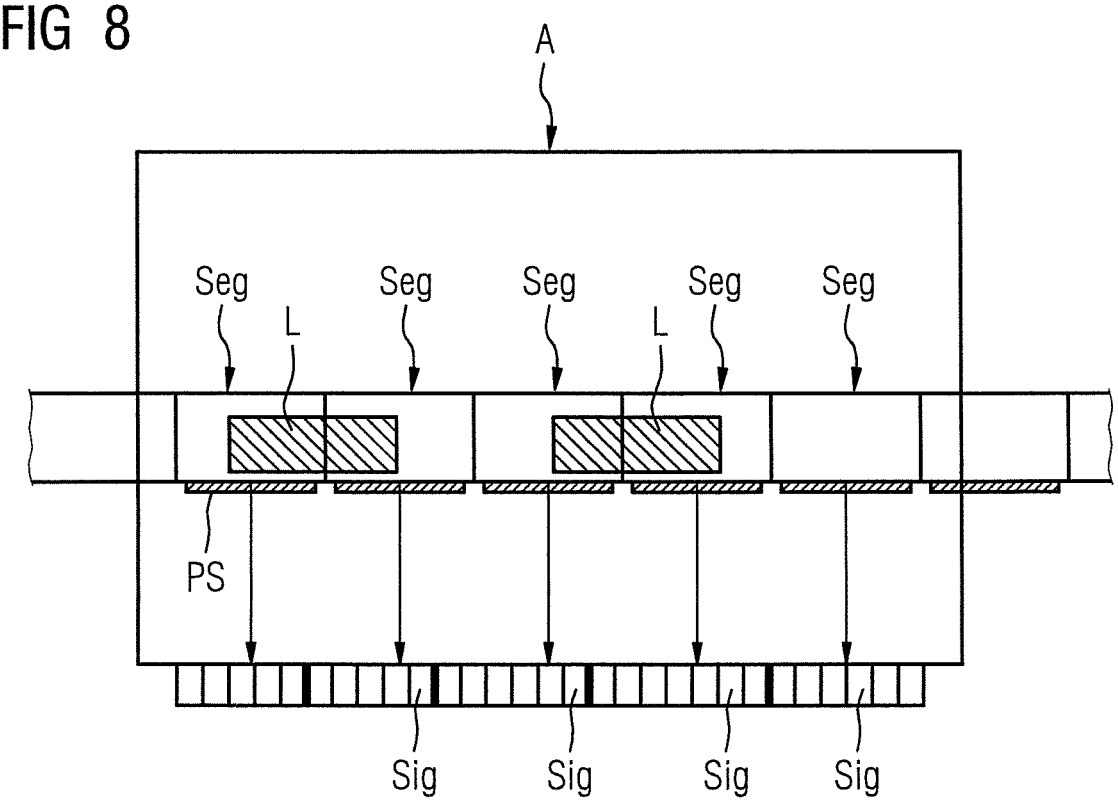
FIG. 8 shows an installation with a linear drive.

FIG. 8 shows an installation A comprising a linear drive LA. The linear drive LA comprises segments Seg and runners L. A sensor PS is assigned in each case to the respective segment Seg. The sensor PS serves to ascertain the position x-ist of the respective runner.

A signal strip Sig is assigned to the respective sensor PS and/or to the respective segment Seg. The signal strip is attached to the installation A in a manner visible from the outside. Respectively one sensor PS is assigned to the respective segment Seg.

The linear drive LA, which is assigned to the installation A, may itself likewise comprise one or more signal strips Sig. The signal strips Sig of the linear drive LA are not necessarily identifiable from the outside.

By arranging the signal strip Sig on the outer side of the installation A, the position x-ist of the respective runner L is visible, even if the runners themselves are not visible in the installation. Further, a state of a segment Seg may be indicated by the corresponding signal strip Sig in a manner visible from the outside. Thus, the position x-ist of the runners L and/or the state of the segments Seg is identifiable visually from outside the installation A.

In summary, the disclosed embodiments of the invention relate to a sensor PS with a signal strip Sig, a segment Seg with such a signal strip Sig and a sensor PS, a linear drive LA and an installation. The signal strip Sig is assigned in each case to at least one segment Seg. The signal strip Sig serves to indicate at least a state of the segment Seg and/or the state of at least one runner L, where the at least one runner L is moved by the respective segment Seg. The state is assigned by a sensor PS assigned to the respective segment Seg. The state may additionally be transferred from a computer network, in particular a service cloud, to the signal strip Sig. Examples of a state of the runner L are the respective position x-ist of the runner L or a need for servicing. The temperature or the functionality are examples for the state of the respective segment Seg. The state is advantageously presented there to a user who services the installation, in particular the linear drive LA of the installation. Thus, the disclosed embodiments of the invention allow the time for the servicing of the installation or of the linear drive LA to be reduced because the operator of the linear drive LA immediately identifies the state of the respective runner L or of the respective segment Seg.

Figure 9:
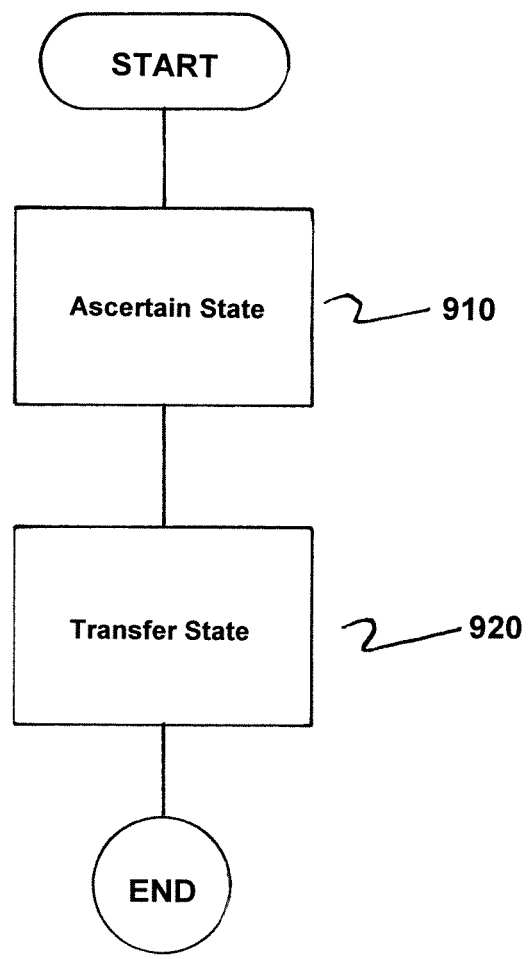
FIG. 9 is a flowchart of the method in accordance with the invention.

FIG. 9 is a flowchart of a method for operating a linear drive LA. The method comprises ascertaining, by a sensor PS, at least one of (i) a position x-ist and (ii) a speed v-ist of a runner L on a segment Seg, a signal strip Sig assigned to the segment Seg indicating a state Z of at least one of a runner L and (ii) the segment Seg, as indicated in step 910. Next, the state Z of one of (i) the at least one runner L and (ii) the segment Seg is transferred from at least one of (i) a sensor PS within the signal strip Sig and (ii) the control device SE within the linear device LA to the signal strip Sig, as indicated in step 920.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A segment for a linear drive for moving at least one runner on the segment, comprising:
    a sensor including a plurality of individual sensor elements and assigned to the segment, said sensor determining at least one of (i) a position and (ii) speed of the at least one runner on the segment; and
    a signal strip assigned to the segment, the signal strip comprising a plurality of signaling devices arranged next to one another;
    wherein the signal strip displays a state of at least one of (i) the at least one runner and (ii) the segment.

2. The segment as claimed in claim 1, wherein the signal strip comprises an LED strip.

3. The segment as claimed in claim 1, wherein the signal strip is assigned to the sensor.

4. The segment as claimed in claim 1, wherein the plurality of signaling devices comprise optical signaling devices.

5. A linear drive comprising the at least one segment as claimed in claim 1, wherein the linear drive comprises a control device; and
    wherein the control device predetermines movement of runners on the at least one segment.

6. The linear drive as claimed in claim 5, wherein the sensor provides at least one of the position and (ii) the speed of the at least one runner for the control device and the control device provides a signal for the signal strip based on at least one of the position and the speed of the at least one runner; and
    wherein the signal strip specifies a state at the position of a corresponding runner based on the signal provided from the control device.

7. The linear drive as claimed in claim 5, wherein the control device provides the signal for the signal strip.

8. The linear drive as claimed in claim 6, wherein the control device provides the signal for the signal strip.

9. The linear drive as claimed in claim 5, wherein the signal for the signal strip is provided by a network.

10. The linear drive as claimed in claim 6, wherein the signal for the signal strip is provided by a network.

11. The linear drive as claimed in claim 7, wherein the signal for the signal strip is provided by a network.

12. The linear drive as claimed in claim 9, wherein the network is one of (i) an intranet, (ii) the Internet and (iii) a Cloud.

13. The linear drive as claimed in claim 5, wherein a state of at least one of (i) the segment and (ii) the runner specifies a degree of dirtying or a functional state of at least one of (i) the runner (L) and (ii) the segment.

14. The linear drive as claimed in claim 5, wherein the signal strip indicates the state depending on the state of the runner on the segment at the position.

15. The linear drive as claimed in claim 14, wherein the state comprises the position of the runner.

16. The linear drive as claimed in claim 5, wherein the linear drive further comprises:
    a signal connection between a respective segment and the control device, wherein the signal connection is provided both for transferring at least one of (i) the position and (ii) the speed from the sensor to the control device and for transferring state signals from the control device (SE) to the respective signal strip.

17. The linear drive as claimed in claim 10, wherein the state signals comprises the state of the respective runner.

18. The linear drive as claimed in claim 5, wherein the signal strip is configured to display an unpredicted state of one of (i) the corresponding segment or (ii) a control unit assigned to the corresponding segment.

19. The linear drive as claimed in claim 5, wherein the at least one runner respectively comprises a storage element configured to record a state of the respective runner, the state of the respective runner being indicatable by the signal strip.

20. A signal strip comprising:
    a plurality of signaling devices arranged next to one another; and
    a sensor including a plurality of individual sensor elements, said sensor determining at least one of (i) a position and (ii) a speed of at least one runner which is movable along the signal strip;
    wherein the signal strip is configured to signal at least one of (i) a position and (ii) movement of a respective runner via the plurality of signaling devices;
    wherein the signal strip is further configured to indicate a state of a segment; and
    wherein the runner is configured to move along the segment.

21. The signal strip as claimed in 20, wherein the plurality of signaling devices comprise optical signaling devices.

22. An installation comprising the linear drive as claimed in claim 5.

23. The installation of claim 22, wherein the installation comprises one of (i) a production machine, (ii) a machine tool, (iii) a packaging machine and (iv) a filling installation.

24. A method for operating a linear drive, the method comprising:
    ascertaining, by a sensor including a plurality of individual sensor elements, at least one of (i) a position and (ii) a speed of a runner on a segment, a signal strip assigned to the segment indicating a state of at least one of a runner and (ii) the segment; and transferring the state of one of (i) the at least one runner and (ii) the segment from at least one of (i) a sensor within the signal strip and (ii) the control device within the linear device to the signal strip.

\* \* \* \* \*